Jan. 3, 1933.  K. C. JAKOUBEK  1,893,236
ANIMAL TRAP
Filed Oct. 27, 1930
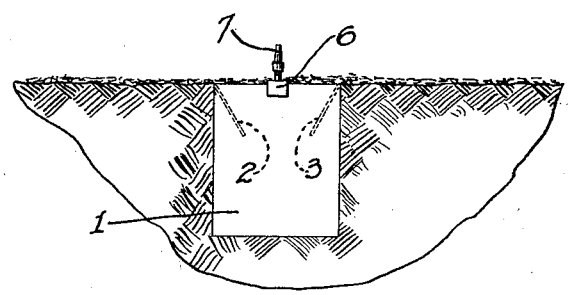
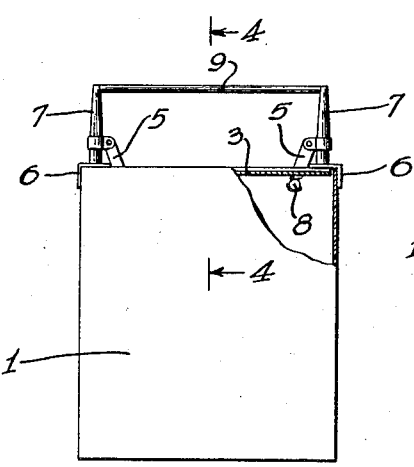
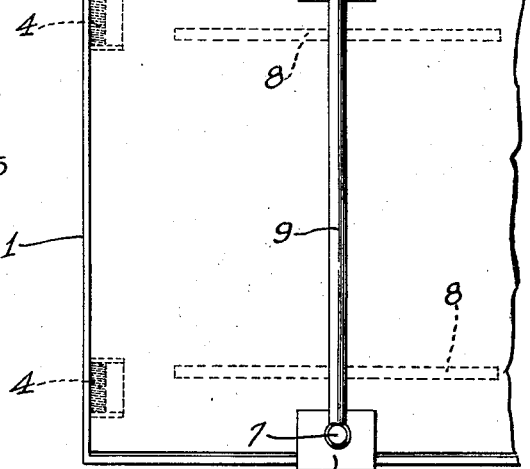
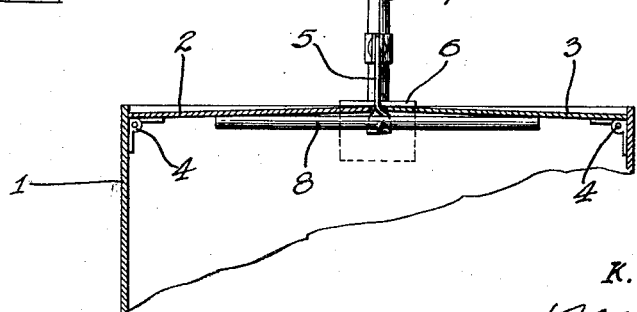
INVENTOR
K. C. Jakoubek
BY Munn & Co.
ATTORNEYS Patented Jan. 3, 1933

1,893,236

UNITED STATES PATENT OFFICE

KAJETAN C. JAKOUBEK, OF PHILLIPS, WISCONSIN

ANIMAL TRAP

Application filed October 27, 1930. Serial No. 491,546.

My invention relates to improvements in animal traps, and it consists in the combinations, constructions, and arrangements herein described and claimed.

An object of my invention is to provide an animal trap of a type whereby animals may be caught alive and without injury thereto or the damaging of the fur.

A further object is to provide a device of the type described which may be placed in an environment frequented by certain animals and disguised so that an animal will not naturally become aware of the trap.

A further object is to provide a trap in which novel means is employed whereby the trap may be easily sprung when an animal reaches a certain position with respect to the trap.

Other objects and advantages will appear in the following specification, and the novel features of the invention will be particularly pointed out in the appended claims.

My invention is illustrated in the accompanying drawing, forming part of this application, in which Figure 1 is a side elevation of my trap demonstrating an installation.

Figure 2 is a view looking from a different angle and showing the device partly in section, Figure 3 is a top plan view of the trap showing a portion removed, and Figure 4 is a sectional view taken along the line 4—4 of Figure 2.

In carrying out my invention, I make use of a box 1 which may be of various dimensions depending upon the animals for which it is designed. The box is preferably formed from sheet metal but may be constructed from any material which may be suitable for the purpose. The box is provided with a cover comprising a pair of sections 2 and 3, see Figure 4. The sections are hingedly connected at the top of the box through the medium of spring hinges 4. The springs are arranged for normally holding the sections substantially in the positions shown in Figure 4. The inner edges of the sections are spaced a short distance apart for permitting arm members 5 to be positioned between the edges of the sections.

The upper part of the box is provided with a pair of supporting elements 6 which are aligned with the inner edges of the sections for supporting props 7. The arms 5 are movably connected with the props and are provided with relatively long sticks 8. These sticks may be positioned underneath the sections 2 and 3 in such a manner that the sections will be firmly associated in a common plane as shown in Figure 4. The props 7 are normally positioned upon the supporting elements 6, see Figure 2. A release stick 9 is placed between the props for supporting the latter as shown in the drawings. At this time the sticks 8 bear against the inner sides of the sections 2 and 3 in such a manner that an animal may step upon the sections and be supported thereby.

When the animal touches the release stick 9, the animal will of course fall into the box. The sections 2 and 3 are at this time moved inwardly as indicated at dotted lines in Figure 1. The spring hinges will of course move the sections so that the box will be closed after the animal has fallen therein.

An important feature in connection with my invention is the fact that I have provided a pair of hinged sections which may be rigidly supported in a common plane and the release stick is positioned in such a manner that the animal is usually positioned near the center of the box before the release stick is moved. The trap provides a firm footing until the release stick is moved. The trap is preferably set in runways or animal paths with the top portion of the trap substantially flush with the surface of the ground.

I claim:

1. An animal trap comprising a box, a pair of sections hingedly connected therewith, supporting means carried by the box, props arranged to be positioned upon said supporting means, means normally positioned within the box for holding the sections in a common plane, and a release stick for holding said props in their normal positions, said release stick being moved when touched by an animal for freeing the sections.

2. An animal trap comprising a box, a pair of sections hingedly connected therewith, supporting means carried by the box, props arranged to be positioned upon said supporting means, means normally positioned within the box for holding the sections in a common plane, a release stick for holding said props in their normal positions, said release stick being moved when touched by an animal for freeing the sections, and means for moving the sections to their normal positions after an animal has fallen into the box.

3. An animal trap means for insertion in an opening in the ground, said trap means comprising a hollow body provided with side walls connected at either end to each other, a pair of sections hingedly connected with the body, supporting means carried by the body, props arranged to be positioned upon said supporting means, a means normally positioned within the body for holding the sections in a common plane, and a release stick for holding said props in their normal positions, said release stick being moved when touched by an animal and freeing the sections.

4. An animal trap means for insertion in an opening in the ground, said trap means comprising a hollow body provided with side walls connected at either end to each other, a pair of sections hingedly connected with the body, supporting means carried by the body, props arranged to be positioned upon said supporting means, a means normally positioned within the body for holding the sections in a common plane, and a release stick for holding said props in their normal positions, said release stick being moved when touched by an animal and freeing the sections and means for moving the sections to their normal positions after the animal has fallen into the hollow body.

KAJETAN C. JAKOUBEK.